United States Patent Office.

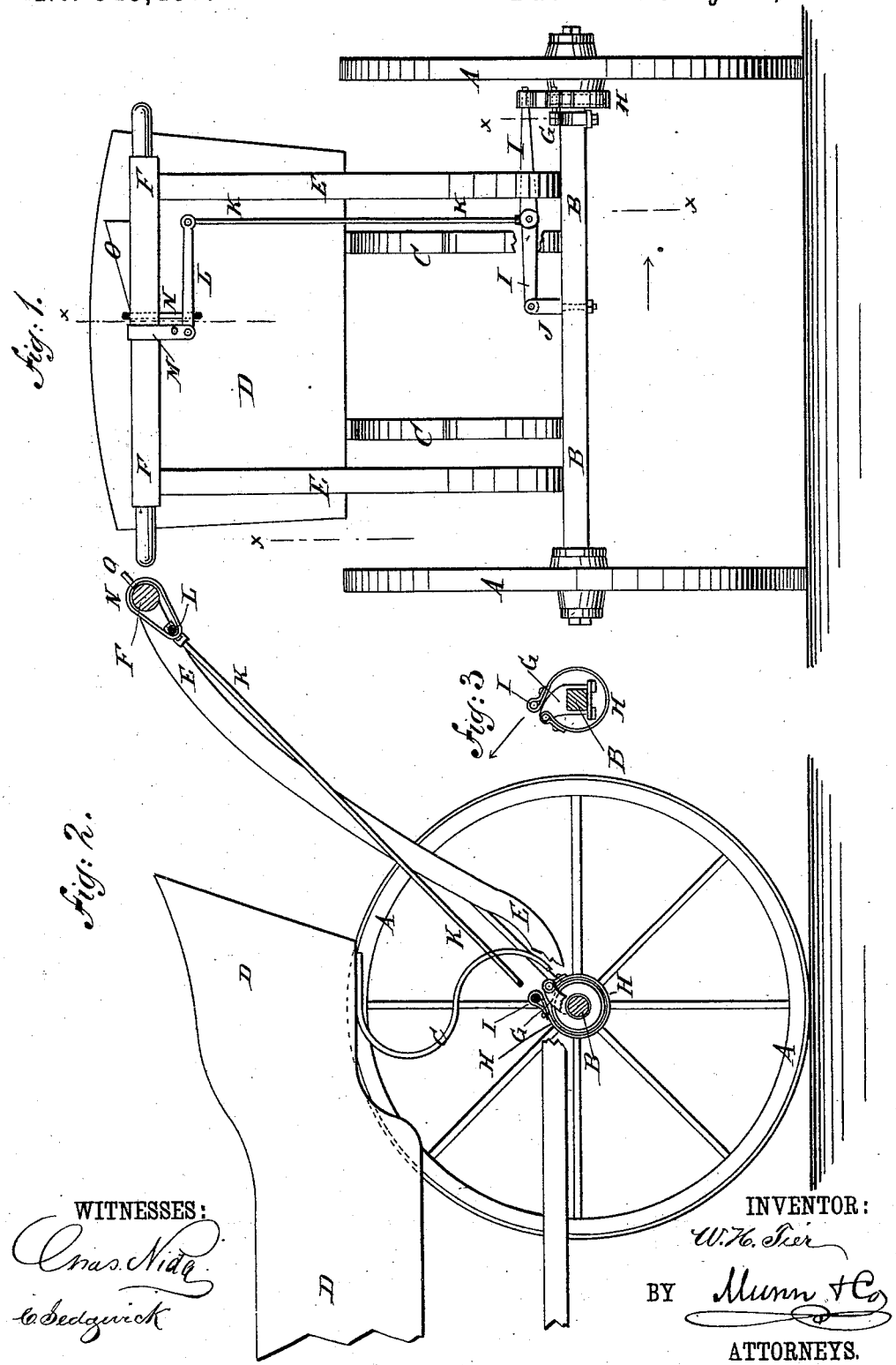

WILLIAM H. TIER, OF ASTORIA, NEW YORK.

BRAKE FOR BABY-CARRIAGES.

SPECIFICATION forming part of Letters Patent No. 345,457, dated July 13, 1886.

Application filed May 13, 1886. Serial No. 202,055. (No model.)

*To all whom it may concern:*

Be it known that I, WILLIAM H. TIER, of Astoria, (Long Island City,) in the county of Queens and State of New York, have invented a new and useful Improvement in Brakes for Baby-Carriages, of which the following is a full, clear, and exact description.

Reference is to be had to the accompanying drawings, forming a part of this specification, in which similar letters of reference indicate corresponding parts in all the figures.

Figures 1 is a rear elevation of a baby-carriage to which my improvement has been applied, part being broken away. Fig. 2 is a side elevation of the same, partly in section, through the broken line $x\ x\ x\ x$, Fig. 1. Fig. 3 is a side elevation of the brake-strap and its support, shown separate from the wheel and with the axle in section.

The object of this invention is to provide brakes for baby-carriages, constructed in such a manner that they can be readily operated to check, stop, or prevent the revolution of the wheels of baby-carriages.

The invention consists in the construction and combination of various parts of the brake for baby-carriages, as will be hereinafter fully described.

A represents the wheels, B the axle, C the springs, D the body, E the handle-arms, and F the handle-bar, of an ordinary baby-carriage.

G is an arm or bracket, clipped to the axle B, and so formed that its outer end will be over the inner end of the hub of the wheel A. To the outer end of the arm G is secured the end of a metallic strap, H, which passes around the inner end of the hub of the wheel A, and is secured at its other end to the outer end of the lever I.

If desired, a metal band can be placed around the inner end of the hub of the wheel A, to prevent the said hub from being worn by the brake-strap H.

The lever I is fulcrumed at its inner end to a support, J, secured to the axle B, and to its middle part is pivoted the lower end of the rod, cord, or chain K. The rod K extends rearward and upward at the inner side of a handle-arm, E, and its upper end is pivoted to the end of a lever, L, placed beneath the handle-bar F, and pivoted at its other end to a support, M, secured to the said handle-bar F. With this construction, by drawing the lever L toward the handle-bar F, the outer end of the lever I will be raised, drawing the metallic strap H around the wheel-hub and checking or stopping the movement of the said wheel, according as less or more force be applied to the said lever L.

N is a link or ring passing around the lever L and around the handle-bar F, and O is an inclined plate or bar attached to the upper side of the handle-bar F. With this construction, by sliding the ring N up the inclined plate O, the brake will be permanently set, so that the baby-carriage, when standing upon inclined ground, will not be liable to start accidentally.

Having thus fully described my invention, I claim as new and desire to secure by Letters Patent—

1. The combination, with the wheel, axle, and handle of a baby-carriage, of the brake-strap H, passed around the wheel-hub, the lever I, connected with the said strap and the axle, the rod K, connected with the said lever, and the lever L, connected with the said rod and handle-bar, substantially as herein shown and described, whereby the movement of the said wheel can be readily checked, stopped, or prevented, as set forth.

2. In a brake for baby-carriages, the combination, with the lever L, connected by the rod K with the lever I, and brake-strap H, and the handle-bar, of the ring N, passing around the said lever and handle-bar, and the inclined plate O, attached to the said handle-bar, substantially as herein shown and described, whereby the brake when set can be readily locked in place, as set forth.

WILLIAM H. TIER.

Witnesses:
 JAMES T. GRAHAM,
 C. SEDGWICK.